United States Patent [19]
Chang

[11] Patent Number: 5,909,304
[45] Date of Patent: Jun. 1, 1999

[54] ACOUSTO-OPTIC TUNABLE FILTER BASED ON ISOTROPIC ACOUSTO-OPTIC DIFFRACTION USING PHASED ARRAY TRANSDUCERS

[75] Inventor: I-Cheng Chang, Sunnyvale, Calif.

[73] Assignee: Aurora Photonics, Inc., Santa Clara, Calif.

[21] Appl. No.: 08/229,546

[22] Filed: Apr. 19, 1994

[51] Int. Cl.$^6$ .................................................... G02F 1/33
[52] U.S. Cl. ..................... 359/308; 359/311; 359/285; 359/287
[58] Field of Search .................................. 359/254, 311, 359/308, 285, 287

[56] References Cited

U.S. PATENT DOCUMENTS

| | | | |
|---|---|---|---|
| 4,052,121 | 10/1977 | Chang | 359/314 |
| 4,342,502 | 8/1982 | Chang | 359/286 |
| 5,329,397 | 7/1994 | Chang | 359/308 |

*Primary Examiner*—David C. Nelms
*Assistant Examiner*—Andrew Q. Tran

[57] ABSTRACT

An acousto-optic tunable filter based on isotropic acousto-optic diffraction using phased array transducers. The isotropic AOTF provides the advantages of narrow optical passband, low acoustic frequencies, and insensitivity to the input optical polarization. Preferred embodiments of the isotropic AOTFs are described for optimized spectral resolution and diffraction efficiency.

8 Claims, 1 Drawing Sheet

ACOUSTO-OPTIC TUNABLE FILTER BASED ON ISOTROPIC ACOUSTO-OPTIC DIFFRACTION USING PHASED ARRAY TRANSDUCERS

BACKGROUND OF THE INVENTION

1. Field of the Invention

This invention relates to the field of electronically tunable optical filters utilizing acousto-optic (AO) diffraction.

2. Description of Prior Art

Acousto-optic tunable filters (AOTFs) have been constructed so that an incident light of a first polarization is diffracted by an acoustic wave in a birefringent crystal to shift from the first to a second polarization of the light beam for a selected bandpass of optical frequencies. The center wavelength of the passband of this type of filter is electronically tunable by changing the frequency of the acoustic wave within the crystal.

The AOTFs can be divided into two broad categories: collinear and noncollinear. In the collinear filter, the incident and diffracted optical waves inside the birefringent crystal are collinear with the acoustic wave. The diffracted light beam at the selected passband is separated from the incident light beam by crossed polarizers. One significant feature of the collinear AOTF is that the narrow filter bandpass can be maintained for incident light within a large angular aperture. The collinear type of acousto-optic filter is disclosed in an article entitled "Acousto-Optic Tunable Filters," appearing on pages 744–747 in the June, 1969 issue of *The Journal of the Optical Society of America* (Vol. 59, No. 6), and in U.S. Pat. No. 3,679,288, entitled "Tunable Acousto-Optic Method and Apparatus."

In the noncollinear filter, the optical waves inside the birefringent crystal are noncollinear with the acoustic wave. The diffracted beam at the passband is selected from the incident light beam either by crossed polarizers or by spatial separation. One type of noncollinear AOTF was described in a paper entitled "Noncollinear Acousto-Optic Filter," presented at the 1973 IEEE/OSA conference on laser engineering and applications and in U.S. Pat. No. 3,953,107; entitled "Acousto-Optic Filter." This type of noncollinear AOTF has a small angular aperture and must be restricted to a well-collimated light source. A second type of noncollinear AOTF is disclosed in an article entitled "Noncollinear Acousto-Optic Filter with Large Angular Aperture," appearing on pages 370–372 of the Oct. 15, 1974 issue of the *Applied Physics Letters* (Vol. 25), and in U.S. Pat. No. 4,052,121 entitled "Noncollinear Tunable Acousto-Optic Filter." In contrast to the first type, this type of noncollinear AOTF has the important feature of large angular aperture. The large angular aperture is due to the proper choices of interaction geometry wherein the tangents to the loci of the incident and diffracted light wave vectors are "parallel," a condition known as non-critical phase matching (NPM).

All of the AOTFs are based on bireflingent diffraction that couples incident light to diffracted light with orthogonal polarizations and different refractive indices. This type of diffraction can occur only in an optical birefringent crystal.

A more comnon type of AO diffraction is the isotropic diffraction that occurs in isotropic media (e.g. crystals or glasses) or in birefringent crystals between incident and diffracted light with the same polarization. In an isotropic diffraction the refractive indices of the incident light and diffracted light are approximately equal. Up to now, isotropic diffraction has not been utilized for AOTF applications.

A different class of AO device is the AO deflector for laser beam scanning. By varying the acoustic frequency the AO deflector scans an incident laser beam into a wide range of resolvable angular positions or spots. A basic performance parameter of the AO deflector is the bandwidth, which is approximately equal to the number of resolvable spots per unit time. The realization of large bandwidth has been one of the major goals in the design of the AO deflector.

One technique of increasing the bandwidth of AO deflector is the use of acoustic beam steering with a phased array of transducers. The simplest phased array employs fixed phase difference of 180 degrees between alternate transducer elements in a planar configuration. By selecting the inter element spacing s to be approximately equal to the characteristic length $L_0$, where $$L_0 = n\Lambda_0^2/\lambda_0 \tag{1}$$

where n is the refractive index of the AO medium, $\Lambda_0$ is the acoustic wavelength at the center frequency and $\lambda_0$ is the optical wavelength, the acoustic beam will be scanned to maintain the phase matching condition over a larger frequency range, thereby increasing the bandwidth of the AO deflector. This technique of increased bandwidth is referred to as tangential phase matching (TPM) since the steered acoustic wavevector is tangential to the locus of the diffracted light vector. A more efficient use of the acoustic power has been demonstrated using a stepped phased array where the height of each step in the phased array is equal to $\Lambda_1/2$. The phased array is blazed so that the beam steering angle from the transducer plane is zero at the reference acoustic wavelength $\Lambda_1$. Wideband AO deflectors using planar and stepped phased arrays were described in an article by Korpel et al entitled, "A Television Display Using Acoustic Deflection and Modulation of Coherent Light" appearing on pages 1667–1675 in the October 1967 issue of Applied Optics, and another article by E. I. Gordon entitled, "A Review of Acousto-Optical Deflection and Modulation of Coherent Light" appearing on pages 325–335 of the same issue of Applied Optics. The stepped array AO deflector was also disclosed inn U.S. Pat. No. 3,493,759. Since the stepped phased array transducers are difficult to implement in practice, simpler fabrication techniques have been proposed. These are disclosed in U.S. Pat. No. 4,381,887, entitled, "Simplified Acousto-Optic Deflector using Electronic Delays," and U.S. Pat. No. 4,671,620, entitled, "Phased-Array Acousto-Optic Bragg Cell".

All of the prior art have limited the discussion on the use of phased array for increasing the bandwidth of AO deflectors by operating at the tangential phase matching; i.e., the selection of the spacing of the phased array element according to Eq. (1).

It is possible to achieve tangential phase matching by combining phased array transducers and birefringent diffraction. The net effect is to shift the acoustic frequency for tangential phase matching. The phased array birefringent deflector is described in the following articles: "Birefringent Phased Array Bragg Cells," 1985 IEEE Ultrasonics Symposium Proceedings, pages 381–384 and "Generalized Phased Array Bragg Interaction in Anisotropic Crystals," 1991 Proceedings of SPIE, Vol. 1476, pages 178–179.

Recent development of AO devices has been focused on integrated optic or guided wave structure, i.e., the interaction between surface acoustic waves (SAW) and guided optical waves. The integrated optic AOTF is described in an article by Y. Ohmachi and J. Noda, entitled, "LiNbO₃ TE-TM Mode Converter Using Collinear Acousto-Optic Interaction" appearing in IEEE Journal of Quantum ElecLronics, Vol. QE-13, pp. 43–46, 1977. To date, all integrated AOTF work has been restricted to LiNbO$_3$ using collinear birefringent AO interaction. The use of phased array transducer for increasing the integrated AO deflector bandwidth has been discussed, for example, in an article entitled, "Efficient Wideband Guided-Wave Acousto-Optic Bragg Diffraction Using Phased-Surface Array in LiNbO$_3$ Waveguide," Appl. Opt., Vol. 16, pp. 1297–1304, May, 1977.

SUMMARY OF THE INVENTION

The present invention provides a preferred configuration of an AOTF using phased array transducers. One object of the present invention is to construct an AOTF based on isotropic diffraction, hereafter referred to as the isotropic AOTF, with the following advantages: (a) The requirement of birefringent crystals is reduced. All types of crystals (isotropic and birefringent) and amorphous solids are eligible as the interaction medium, (b) The AOTF is insensitive to the polarization of the incident light and can be used to select narrowband unpolarized light, (c) The diffracted light beam is spatially separable from the incident light and no polarizers are required.

Another object of the present invention is to provide preferred configurations of the isotropic AOTF for maximizing tuning range, spectral resolution or diffraction efficiency.

DESCRIPTION OF THE REFERRED EMBODIMENTS

Figure 1:
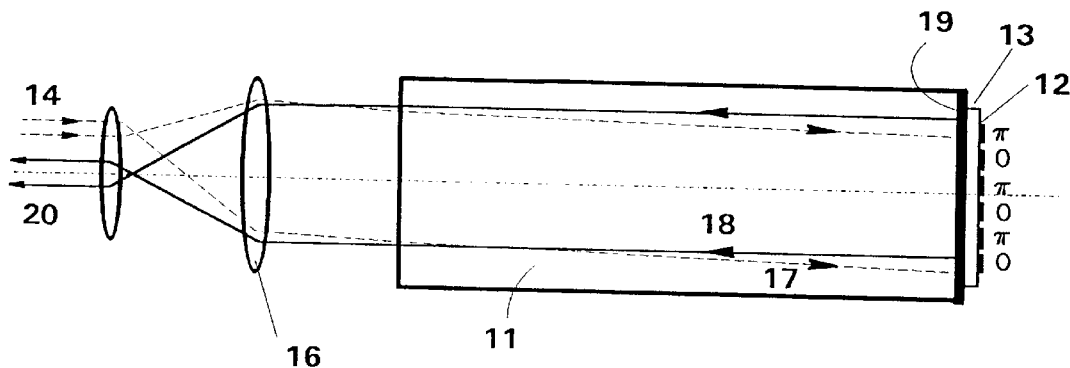
FIG. 1 is a schematic of a preferred embodiment of an isotropic AOTF in accordance with the present invention.

The essence of the present invention is the discovery that by properly incorporating phased array transducers in an AOTF it is possible to overcome the various deficiencies of prior art AOTFs and significantly enhance AOTFs performance. Referring to FIG. 1, therein is shown, diagramatically, a isotropic AOTF in accordance with the present invention. The AOTF comprises a suitable AO medium 11 which may be either an isotropic or a birefringent crystal. A planar acoustic array comprising of a large number of transducer elements 12 is mounted in intimate contact with the AO medium 11 on a common planar surface 13. The individual transducer launches an acoustic wave along the acoustic wavevector direction $\vec{k}_a$ which is normal to the transducer face 13. Radio frequency (RF) signals are applied such that the phase of adjacent elements are 180°. The transducer array with alternative 0° and 180° phases forms a phase grating along an array vector $\vec{k}_b$ which is normal to the acoustic wavevector $\vec{k}_a$. The magnitude of $\vec{k}_b$ is equal to $2\pi/\Lambda_b$, where $\Lambda_b$ is the array wavelength and is equal to twice the spacing between adjacent elements of the transducer array. When the acoustic waves from all of the acoustic phase arrays are combined, they interfere constructively to form a spatially modulated acoustic wave with a resultant wavevector $\vec{k}_c$ which is equal to the vector sum of the acoustic wavevector $\vec{k}_a$ (for individual transducer element) and the array vector $\vec{k}_b$. For the planar phased array transducers, there will be two composite acoustic waves $\vec{k}_c = \vec{k}_a \pm \vec{k}_b$, that are symmetrical to the acoustic wave direction. An incident optical beam 14, which may be either a broadband incoherent light or a number of laser beams with different wavelengths is expanded by the combination of input lens 15 and 16 and enters the AO medium 11, propagates along the predetermined axis 17. Part of the incident beam at the selected wavelength is diffracted into a direction that is substantially collinear with the acoustic wave. The diffracted optical beam 18 is reflected by an internal mirror 19 coated on the transducer face 13, exits the AO medium 11 and is focused and spatially separated from the incident light beam 14 by the lens combination 15 and 16 as a filtered output beam 20.

Figure 2A:
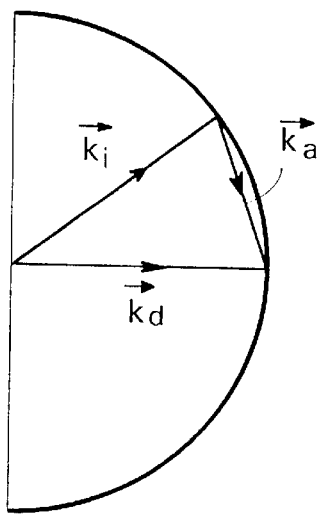
FIGS. 2a and 2b are wavevector diagrams for isotropic AO diffraction: (a) single transducer (b) tangential phase matching using phased array transducer.

The following is a discussion on the basic concept of the isotropic AOTF in accordance with the present invention. Referring to FIG. 2(a), which shows the wavevector diagram of AO interaction in an isotropic medium using a single transducer. For efficient AO diffraction to take place, the momentum matching condition must be satisfied, i.e., $$\vec{k}_d = \vec{k}_i + \vec{k}_a \tag{2}$$

The magnitude of the optical and acoustic wavevectors are given by:

$$k_i = \frac{2\pi n_i}{\lambda_o}, \ k_d = \frac{2\pi n_d}{\lambda_o}, \ k_a = \frac{2\pi}{\Lambda_a} = \frac{2\pi f_a}{V} \tag{3}$$

where $n_i$ and $n_d$ are the refractive indices for the incident and diffracted light, $\lambda_o$ is the optical wavelength, $\Lambda_a$, $f_a$ and V are the wavelength, frequency, and velocity of the acoustic wave. For isotropic diffraction $n_i = n_d = n$, Eq. (2) reduces to the well-known Bragg relation $$\sin\theta_B = \frac{\lambda_o}{2n\Lambda_a} = \frac{\lambda_o f_a}{2nV} \tag{4}$$

The AO diffraction can be viewed as a spatial modulation of light. In general, the acoustic wavevector can be decomposed into a transverse and a longitudinal component. The transverse spatial modulation deflects the incident light beam to different directions. The longitudinal spatial modulation provides a spectral modulation of light. The longitudinal spatial modulation frequency is equal to the projection of the spatial frequency of the acoustic wave. In other words, the wavelength of the longitudinal spatial modulation is given by (using Eq., (4))

$$\Lambda_l = \frac{\Lambda_a}{\sin\theta_B} = 2L_o \tag{5}$$

where $L_o$ is the characteristic length defined in Eq. (1).

When the wavelength of light $\lambda_o$ is changed, there will be a corresponding phase mismatch that results in a finite bandwidth $\Delta\lambda$ for the AO diffraction. The spectral resolving power is $$\lambda_o/\Delta\lambda = L/\Lambda_l \tag{6}$$

where L is the optical path of the filter.

Substituting Eq. (5) into Eq. (6) and solving for the acoustic wavelength $$\Lambda_a = \left(\frac{L\Delta\lambda}{2n}\right)^{1/2} \quad (7)$$

Figure 2B:
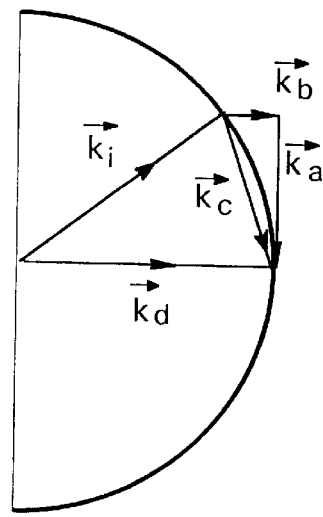

Consider, for example, the diffraction of light by a shear acoustic wave polarized along [110] and propagating along [112] direction in the cubic crystal of GaAs, V=3.08 mm/μsec. At $\lambda_0$=1.55 μm, n=3.37. Suppose the AOTF is designed to have a bandwidth of 1 nm using a 4 cm long optical path. From Eqs. (6) and (7) the acoustic wavelength and its longitudinal components are $\Lambda_a$=2.44 μm and $\Lambda_1$=25.8 μm. This corresponds to an acoustic frequency $f_a$=V/$\Lambda_a$=1.26 GHz. This high frequency is impractical for AOTF operation since the acoustic attenuation and transducer insertion loss would be unacceptably high. As a result isotropic AO diffraction has not been used for AOTF applications. FIG. 2(b) shows the wavevector diagram for an AO deflector using phased array transducers. Increased bandwidth is obtained by specifying the spacing between adjacent transducer elements according to Eq. (1). As shown in FIG. 2(b) the acoustic wavevector is tangential to the locus of optical wavevector and therefore has a zero longitudinal spatial modulation component. Obviously the phased array AO interaction satisfying the TPM condition is not applicable to the operation of AOTFs.

Figure 3A:
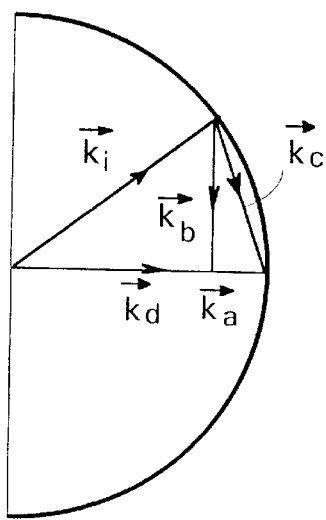
FIGS. 3a and 3b are wavevector diagrams for a preferred embodiments of isotropic AOTFs.

FIG. 3(a) shows the wavevector diagram for the isotropic AOTF shown in FIG. 1. Notice that in this case the momentum matching condition (Eq. (2)) becomes $$\vec{k}_d = \vec{k}_i + \vec{k}_c = \vec{k}_i + \vec{k}_a + \vec{k}_b \quad (8)$$

Thus, the difference of the diffracted and incident optical wavevector is now equal to the wavevector for the composite acoustic wave, $\vec{k}_a$, which is equal to the vector sum of the single element acoustic wavevector $k_a$ and the phased array vector $\vec{k}_b$. For the preferred interaction geometry, $\vec{k}_a$ is collinear with the diffracted optical wavevector. Inspection of the figure shows $$\Lambda_a = \Lambda_l = 2\frac{n\Lambda_c^2}{\lambda_o} \quad (9)$$

where $\Lambda_c$ is the wavelength of the composite acoustic wave.

Figure 3B:
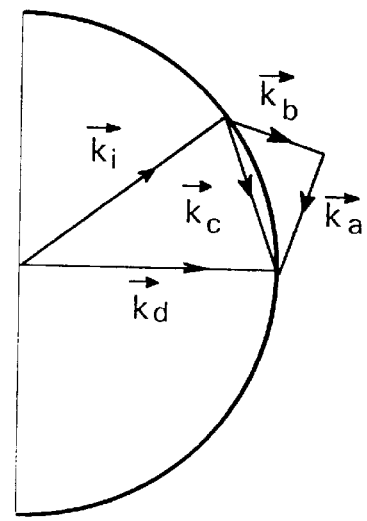

In the preferred interaction geometry the array vector $\vec{k}_b$ is chosen to be tangential to the diffracted light locus. This has the advantage of minimizing the wavelength dispersion of deflection angle. Another choice is to allow the acoustic wavevector to be collinear with the incident light for maximizing interaction length. The direction of acoustic wavevector may be chosen for optimized AO figure of merit. For acoustically anisotropic crystals the acoustic energy flow is along the acoustic group velocity direction, a preferred choice for maximizing the interaction length is to select the acoustic wavevector so that the acoustic group velocity is collinear with the direction of the incident light. FIG. 3(b) shows the wavevector diagram for the general case of isotropic AOTF.

A number of efficient AO materials are suitable interaction medium for the AOTF of the present invention. These materials include GaAs, GaP, $TeO_2$, $LiNbO_3$, $LiTaO_3$, $Hg_2Cl_2$, $Hg_2Br_2$, $TiO_2$ and crystal quartz.

There are several modifications of the preferred embodiments that provide additional performance improvements. For instance, by choosing predetermined amplitudes for the voltage distribution on the transducer array, the bandpass response of the spatially modulated AOTF can be apodized to achieve suppression of lower sidelobes.

While what has been described above are preferred embodiments, it should be understood that many different embodiments of this invention could be made without departing from the scope thereof, it is intended that all matter contained in the above description or shown in the accompanying drawings shall be interpreted as illustrative and not in a limiting sense.

I claim:

1. A method for diffracting light comprising the steps of generating a plurality of acoustic waves from an acoustical phased array in an acousto-optic medium to form a spatially modulated acoustic wave, the resultant wavevector of said spatially modulated acoustic wave being equal to the vector sum of the wavevector of a single acoustic wave and the array vector of the acoustical phase grating, passing an incident light through said medium, selecting said resultant wavevector of said spatially modulated acoustic wave to cause isotropic acousto-optic diffraction of said incident light into a diffracted light, and selecting the direction of said single acoustic wave to deviate substantially from the tangent to the locus of said diffracted light.

2. The method of claim 1 including the step of varying the frequency and amplitude of said single acoustic wave to change the center wavelength and amplitude of said diffracted light.

3. An acousto-optic tunable filter comprising an acousto-optic medium, means for coupling and passing an incident light beam through said medium, an acoustical phased array coupled to said acousto-optic medium for generating a spatially modulated acoustic wave with a resultant wavevector being equal to the vector sum of the wavevector of a single acoustic wave and the array vector, means for selecting said resultant wavevector of said spatially modulated acoustic wave to cause isotropic acousto-optic diffraction of said incident light into a diffracted light so that the optical frequencies of said diffracted light are narrower than the optical frequencies of said incident light.

4. An acousto-optic tunable filter as in claim 3, including means for varying the frequency and amplitude of said single acoustic wave to change the center wavelength and amplitude of said diffracted light.

5. An acousto-optic tunable filter as in claim 3 including means for selecting said single acoustic wave vector to be substantially collinear with the diffracted light.

6. An acousto-optic tunable filter as in claim 3 including means for selecting said spatially modulated acoustic waves so that the group energy of said spatially modulated acoustic wave is substantially collinear with the incident light.

7. An acousto-optic tunable filter as in claim 3 wherein said acoustical phased array comprising a planar array of transducers coupled to said medium, and means for selecting the phase difference between adjacent transducer elements to be 180°.

8. An acousto-optic tunable filter as in claim 3 wherein said acoustical phased array comprising a stepped transducer array blazed at proper angle for exciting a single spatially modulated acoustic wave.

* * * * *